Figure 1:
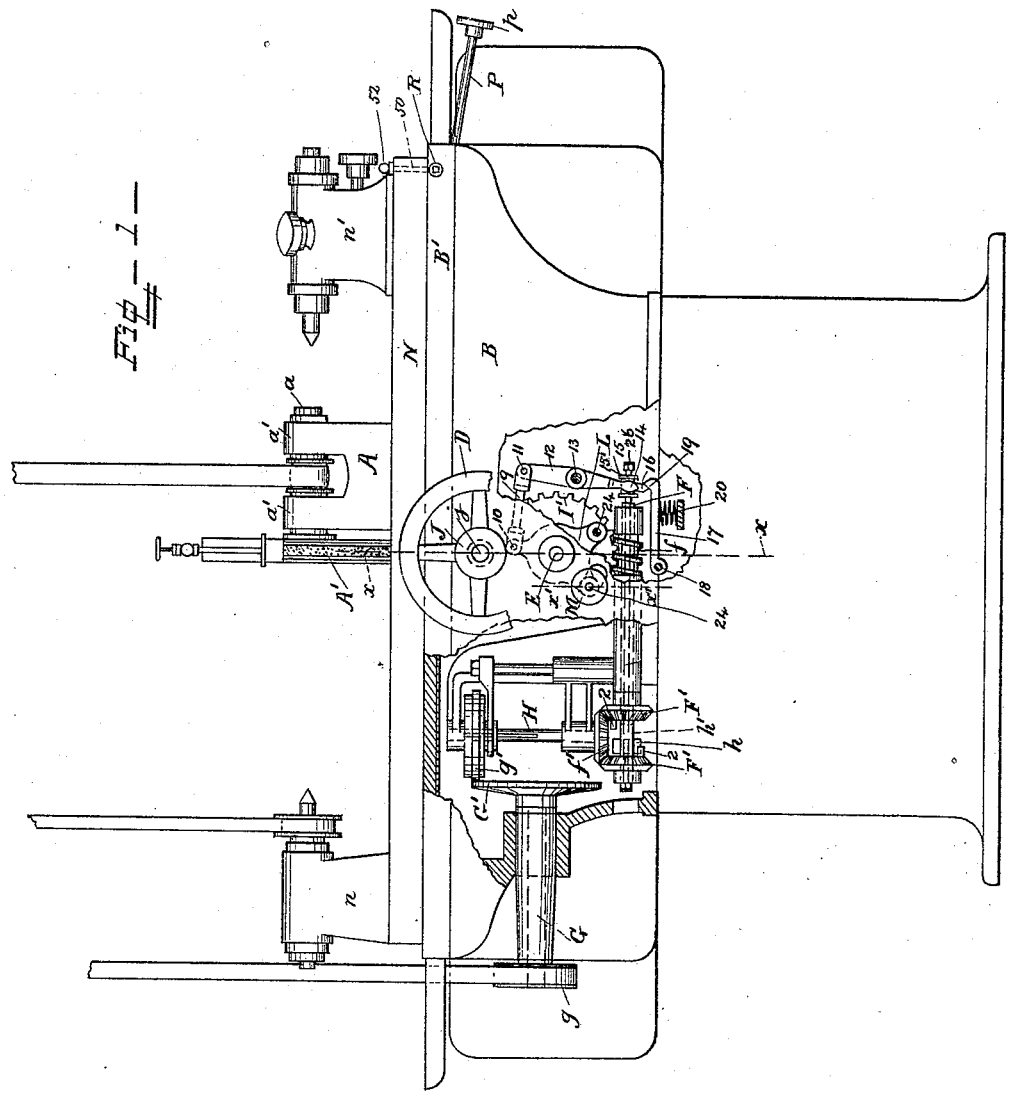

(No Model.)  4 Sheets—Sheet 1.

A. B. LANDIS.
GRINDING MACHINE.

No. 444,121. Patented Jan. 6, 1891.

WITNESSES
E. R. R. Hoyt.
Thos. P. Graham

INVENTOR
A. B. Landis.
by Herbert W. T. Jenner,
Attorney

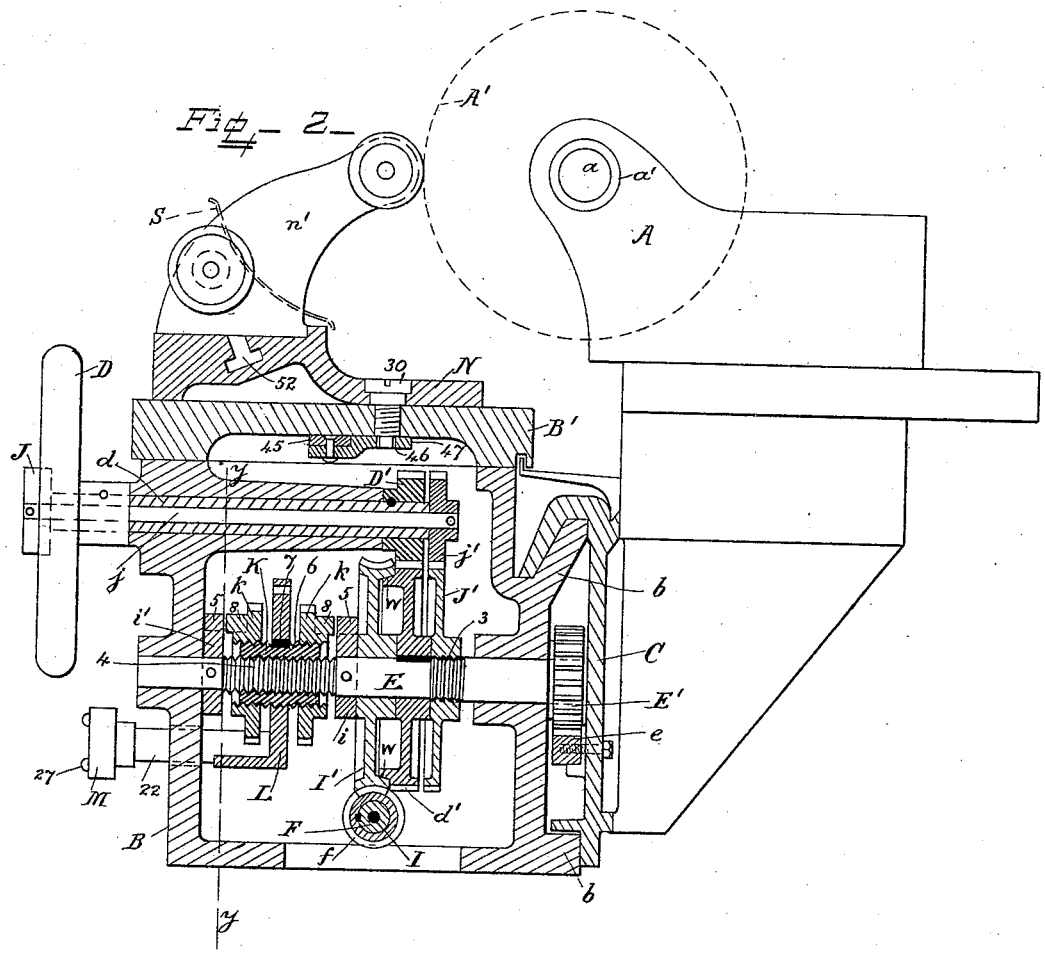
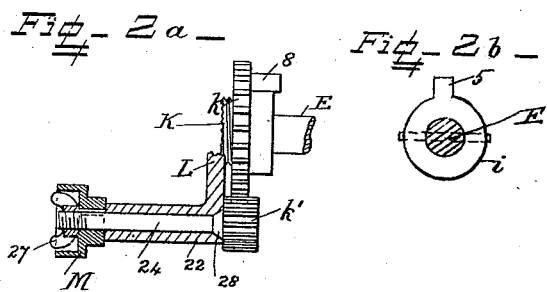

(No Model.) 4 Sheets—Sheet 3.
A. B. LANDIS.
GRINDING MACHINE.
No. 444,121. Patented Jan. 6, 1891.
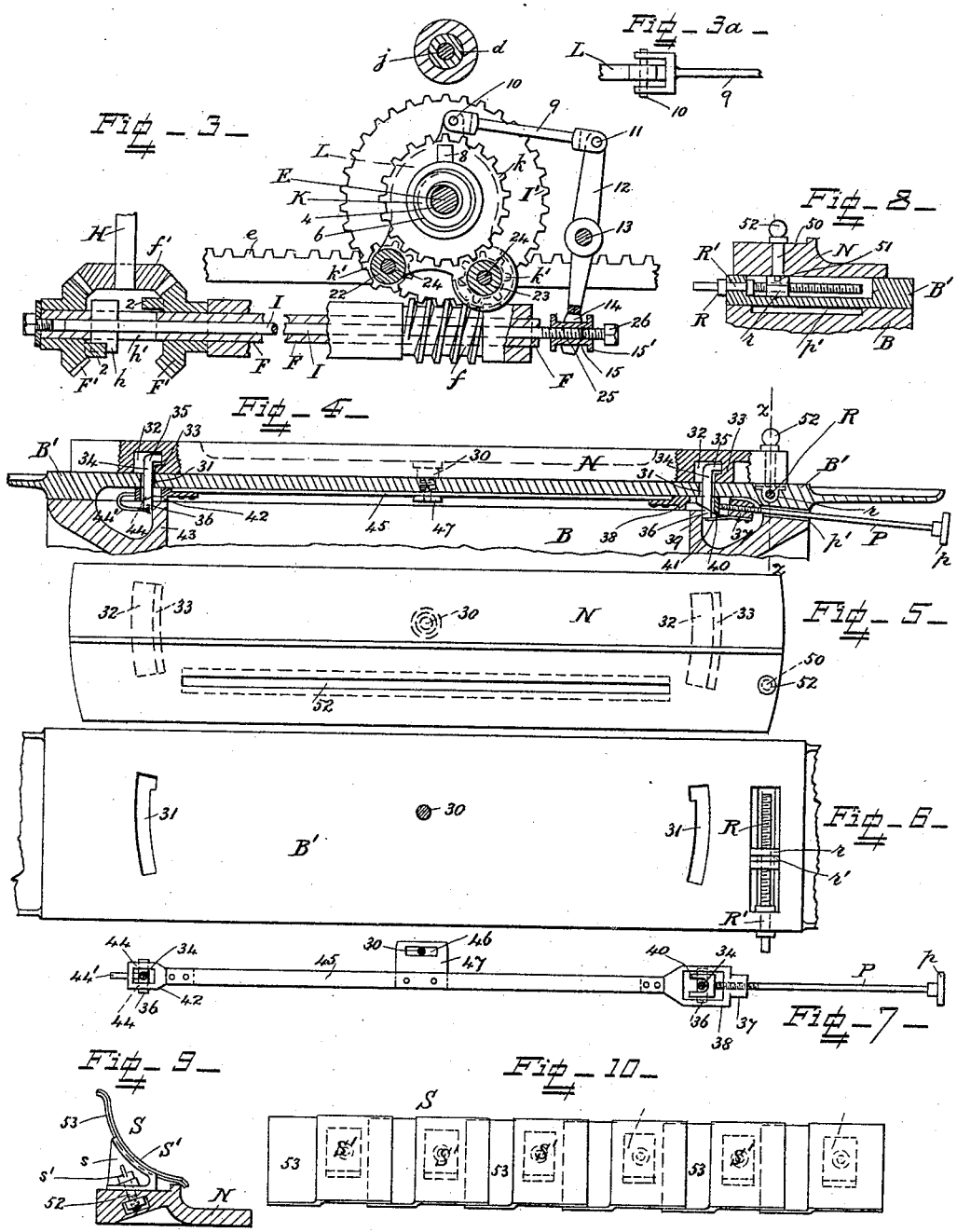
WITNESSES 
INVENTOR
A. B. Landis
by Herbert W. T. Jenner.
Attorney

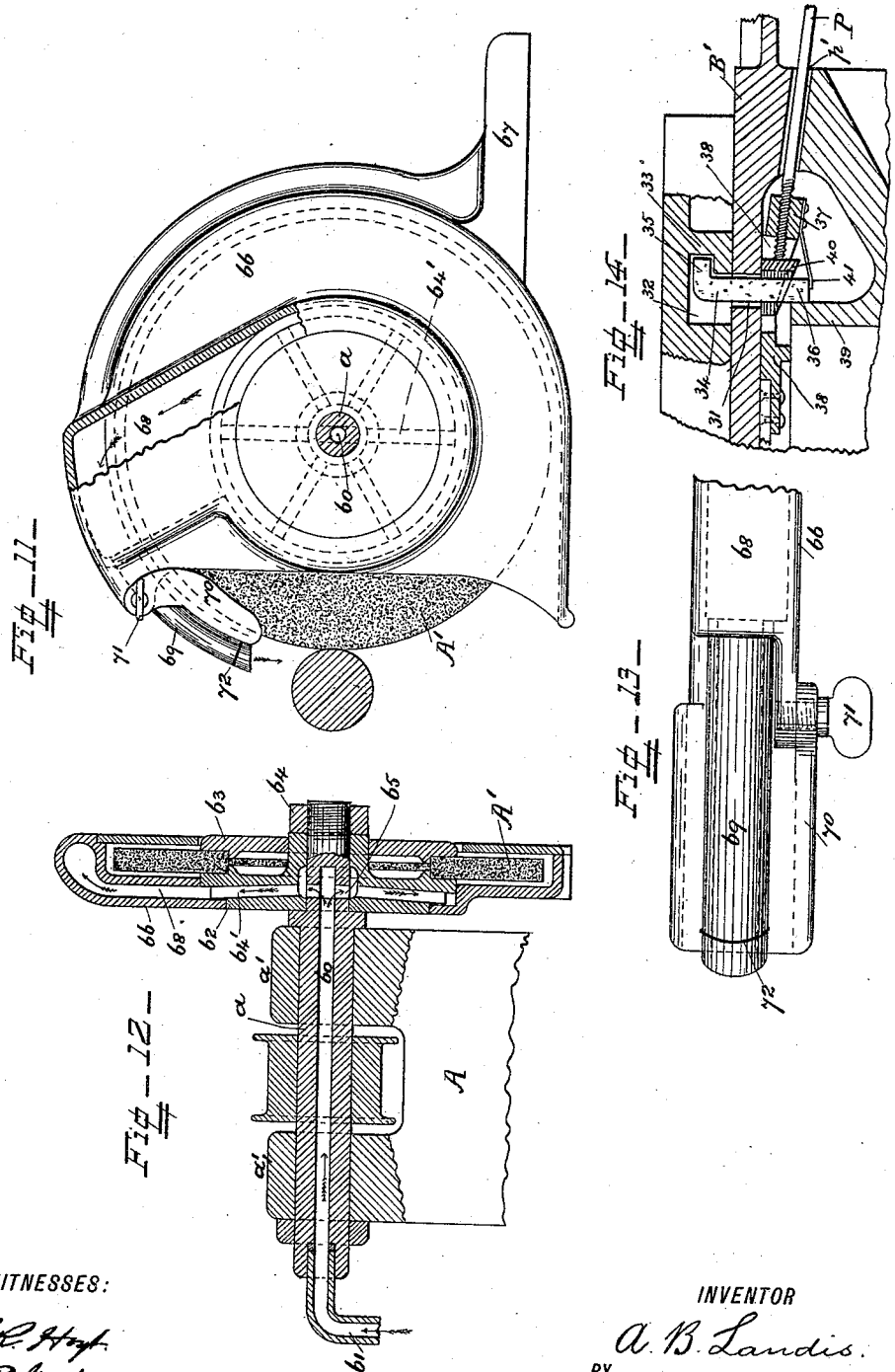

UNITED STATES PATENT OFFICE.

ABRAHAM B. LANDIS, OF WAYNESBOROUGH, PENNSYLVANIA.

GRINDING-MACHINE.

SPECIFICATION forming part of Letters Patent No. 444,121, dated January 6, 1891.

Application filed September 15, 1890. Serial No. 365,083. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Grinding-Machines; and I do hereby declare the following to be a full, clear, and exact description of the invention, such as will enable others skilled in the art to which it appertains to make and use the same.

This invention relates to grinding-machines; and it consists in the novel construction and combination of parts hereinafter fully described and claimed.

In the drawings, Figure 1 is a front view of the machine, partly in longitudinal section. Fig. 2 is a cross-section through the reversing-gear, taken on the line $x$ $x$ in Fig. 1.
Fig. $2^a$ is a cross-section through one of the traverse-adjusting devices, taken on the line $x'$ $x'$ in Fig. 1. Fig. $2^b$ is a detail view of the collar $i$. Fig. $2^c$ is a detail view of the short shaft 24. Fig. 3 is a longitudinal section through the reversing-gear, taken on the line $y$ $y$ in Fig. 2. Fig. $3^a$ is a detail view of one end of rod 9. Fig. 4 is a longitudinal section through the table, showing the clamping devices. Fig. 5 is a plan view of the table from above. Fig. 6 is a plan view of the top of the bed upon which the table rests. Fig. 7 is a plan view of the clamping devices under the table. Fig. $7^a$ is a detail view of one of the clamping-bolts 34. Fig. 8 is a cross-section through the table, taken on the line $z$ $z$ in Fig. 4, and showing the devices for adjusting its angularity. Fig. 9 is an end view of the water-fender, and Fig. 10 is a plan view of the same from above. Fig. 11 is an end view of the grinding-wheel and its supports. Fig. 12 is a longitudinal section through the same, and Fig. 13 is a plan view of the device for regulating the position of the water-discharge pipe shown in Fig. 11. Fig. 14 is a detail view, drawn to a larger scale, of a portion of the clamping devices shown in Fig. 4.

A is the grinding-wheel support, provided with bearings $a'$, and A' is the grinding-wheel, mounted on the shaft $a$, journaled in the said bearings.

B is the bed of the machine, provided with longitudinal guides $b$ at the back, and C is a carriage sliding back and forth upon the said guides. The grinding-wheel support is supported by the carriage C, and is provided with means for moving it transversely and swiveling it around; but these devices do not form a part of the present invention.

The longitudinal traverse of the carriage and the grinding-wheel is effected by hand by means of the hand-wheel D, secured upon the sleeve $d$, journaled in the bed. A toothed pinion D', secured upon the sleeve $d$ inside the bed, gears into a toothed wheel $d'$, which is splined upon the shaft E, journaled in the bed under the said sleeve. The shaft E has a toothed pinion E' secured upon its end outside the bed at the rear, and this pinion E' gears into a toothed rack $e$, secured to the carriage C.

F is a longitudinal shaft journaled in suitable bearings inside the bed under the said shaft E. This shaft F has a worm $f$ secured upon it, and is driven in either direction. This shaft and worm afford a means for imparting an automatic traversing motion to the grinding-wheel.

F' F' are beveled toothed pinions journaled loose upon the shaft F and continuously revolved by the beveled toothed pinion $f'$, which gears into both of them. Rotary motion may be imparted to the toothed pinion $f'$ by any approved mechanism; but the mechanism which will now be described is preferred.

G is a longitudinal shaft journaled in the end of the bed and provided with a belt-pulley $g$, secured to one end of it. G' is a friction-disk secured upon the other end of the said shaft G, and $g'$ is a friction-wheel bearing against the said disk and splined upon a vertical shaft H, journaled in suitable bearings inside the bed. The beveled toothed pinion $f'$ is secured upon the lower end of the shaft H, and is revolved by the belt-pulley $g$ and the friction-wheels G' and $g'$, as shown in the drawings.

In order to reverse the direction of the revolution of the longitudinal shaft F, a cross-plate $h$ is arranged to slide in longitudinal slots $h'$ in the shaft F between the pinions F' F', and the said pinions are each provided with a projection 2, with which the said plate engages.

The shaft F is hollow and I s a rod which slides longitudinally in the said hollow shaft F. The plate $h$ is secured to the rod I, the said plate being driven tightly into a cross-slot in the said rod, and the direction of the revolution is changed by moving the rod longitudinally in the shaft and causing the plate $h$ to engage with one or the other of the projections on the pinions F′, which are revolved continuously in opposite directions, as previously described.

I′ is a worm-wheel, which runs loose upon the shaft E and gears into the worm $f$ beneath it. The front side of the hub of the worm-wheel bears against the fixed collar $i$ on the shaft E, and $w$ is a friction-clutch upon the other side of the worm-wheel and projecting from the toothed wheel $d'$.

The automatic traverse of the grinding-wheel in a longitudinal direction is effected by means of the knob J, which is secured upon the spindle $j$, journaled in the sleeve $d$. A toothed pinion $j'$ is secured upon the end of the spindle $j$, which projects through the pinion D′, and the pinion $j'$ gears into a toothed wheel J′, mounted upon the shaft E on the opposite side of the wheel $d'$ from the worm-wheel. The hub of the wheel J′ is screw-threaded and engages with the screw-threaded portion 3 upon the said shaft E. When the knob J is turned in the correct direction to cause the pinion $j'$ and wheel J′ to revolve and to press the friction-clutch on the splined sliding wheel $d'$ into engagement with the other part of the said clutch in the worm-wheel, the said worm-wheel is coupled to the shaft E. The said shaft E is thereby revolved by the worm under the worm-wheel, and the grinding-wheel is traversed longitudinally along the bed, the direction of its motion being determined by the connection of the reversing cross-plate $h$ with one or the other of the pinions F′, as previously described.

The reversal of the direction of the motion of the grinding-wheel at each end of its travel is adjusted and effected automatically by the mechanism which will now be described. The shaft E is provided with a screw-threaded portion 4, and K is a screw-threaded sleeve, which moves longitudinally back and forth for a limited distance upon the said screw-threaded portion 4 between the collar $i$ and a similar collar $i'$, secured to the shaft E beyond the other end of the sleeve from the collar $i$. Each collar $i$ and $i'$ is provided with a similar projection 5, by means of which the reversal is effected. The projections 5 project radially from the periphery of the collars, as shown in Fig. 2ᵇ, and effect the reversal of the traverse mechanism by arresting the longitudinal motion of the said sleeve K and the parts carried by it, as will be more fully described hereinafter.

The sleeve K is provided with a screw-threaded portion 6 upon its outside, and the pitch and direction of the screw-threads upon the shaft at 4 and upon the sleeve at 6 are preferably made exactly the same.

L is a plate which is secured upon the middle of the sleeve K by the key 7, and $k$ are toothed wheels provided with screw-threaded hubs and mounted upon the sleeve K upon each side of the plate L. Each wheel $k$ is provided with an outwardly-projecting lug 8, which is adapted to engage with the projection 5 upon the collar $i$ or $i'$, to which it is next adjacent.

A rod 9 is pivoted by the pin 10 to the upper part of the plate L, (see Figs. 3 and 3ᵃ,) and is pivoted at its other end by the pin 11 to the upper end of the reversing-lever 12, which is journaled on a rod 13, running across the machine-bed. The lower end of the lever 12 is provided with a fork 14, which engages loosely with the flanges of the thimble 15, secured upon the end of the rod I, which projects through the shaft F. A wedge-shaped projection 16 also projects from the lower end of the lever 12 below the fork, and 17 is an arm pivoted at one end to the bed by the pin 18 and provided with a wedge-shaped projection 19 at its opposite end. A spring 20 is arranged below the arm 17, so as to press the two projections 19 and 16 together. These projections are both V-shaped, as shown, and are arranged with the points of the wedges together.

When the automatic longitudinal traverse-gear is in operation and the shaft E is being revolved by the worm and worm-wheel, the sleeve K is slid longitudinally of the shaft E by means of the screw-threaded portion 4 on the shaft which engages with the said sleeve. As the sleeve slides, it carries with it the plate L and the two wheels $k$, the direction of the motion being according to the connection of the cross-plate $h$ with one or the other of the pinions F′, as previously described. The wheels $k$ do not change their position with regard to the plate L while the sleeve K is being moved lengthwise by the screw-threaded portion of the shaft E inside it, because the teeth of the said wheels are in gear with the teeth of the pinions $k'$, which pinions are prevented from revolving, as will be more fully described hereinafter.

The plate L is provided with two bearings 22 and 23 upon its lower side. A small shaft 24 is journaled in each of these bearings and projects through an opening in the front of the bed of the machine. A toothed pinion $k'$ is secured upon the inner end of each shaft 24, and each one of the said toothed pinions gears into one of the toothed wheels $k$. One of the shafts 24 is longer than the other, as shown in Fig. 2ᶜ, so as to extend under the plate L and permit one of the pinions $k'$ to gear into the wheel $k$ on the rear side of the plate L; but otherwise the two shafts 24 are exactly alike.

When the sleeve K has been moved lengthwise on the shaft E sufficiently to cause one of the lugs 8 on the wheels $k$ to strike against one of the projections 5 of the collars $i$ or $i'$, which always revolve with the shaft E, the collar thus engaged turns the wheel $k$ thus coupled to it together with the sleeve K. This circular motion of the sleeve K oscillates in one direction the pinion $k'$, engaging with the said wheel $k$, and the plate L, by which the said pinion and its shaft are supported. The other wheel $k$ is also partially revolved and its pinion is also oscillated, but they do not affect the action of the device at this period. The wheel $k$ thus partially revolved by direct connection with the projection on the revolving collar causes the plate L to be oscillated in one direction upon the shaft E, thereby moving the rod 9 and causing the reversing-lever 12 to move the rod I longitudinally. The rod withdraws the cross-plate $h$ from engagement with one of the pinions F'. This motion also causes the point of the projection 16 to pass over the point of the projection 19 on the arm 17, and the spring under the arm forces the two wedge-shaped projections together and shoots the rod still farther in the same longitudinal direction in which it had previously been moved by the reversing-lever, thereby causing the cross-plate $h$ to engage with the projection on the opposite pinion F'. This change of connection of the plate $h$ from one to the other of the pinions F' reverses the direction of the travel of the grinding-wheel, as previously described, and the reversal is again effected at the end of the return-stroke by the other wheel $k$ and its collar in a similar manner to that described.

It is essential that there should be some clearance, as shown, between the ends of the fork 14 and the flanges 15' of the thimble 15 in order that the wedge-shaped projections may secure a working bearing against each other as soon as the point of one has passed the point of the other. The rod I is provided with a screw-threaded end 25, and the thimble has a screw-threaded hole so that its position may be adjusted lengthwise upon the end of the said rod. A screw 26 is inserted into the screw-threaded hole of the thimble and bears against the end of the rod I. The thimble is locked upon the rod after being adjusted lengthwise by screwing the end of the screw 26 hard against the end of the rod. The pins 10 and 11 of the rod 9 are made long enough to permit them to slide in the holes in the plate L and in the lever 12, so that the plate L may move lengthwise with the sleeve K and still be operatively connected to the lever 12.

M are knobs secured upon the ends of the shafts 24 outside the machine-bed, and the extent of the longitudinal travel of the grinding-head is adjusted by turning the pinions $k'$ by means of the knobs M, and thereby revolving the wheels $k$ upon the ends of the screw-threaded sleeve K. When the wheels $k$ are revolved upon the screw-threaded sleeve so as to be close to the plate L, they have to be moved lengthwise with and by the sleeve K for a considerable distance before their lugs 8 can engage with the projections 5 on the collars $i$ or $i'$ to cause the reversal of the traversing gear, and the extent of the longitudinal traverse is therefore considerable. The reverse of this occurs when the wheels $k$ are moved apart upon the sleeve K, as shown in the drawings, and the traverse is then consequently very short.

The traversing gear may be reversed by hand when desired, by taking hold of one of the knobs M and rocking the plate L to the right or to the left, according to the desired change in the direction of the motion.

Each knob M serves to regulate the distance traversed by the grinding-wheel upon each respective side of the cross center line of the machine through the shaft E and between the said knobs. When the length of the traverse has been adjusted by means of the knobs M, the shafts 24 may be clamped so that the wheels $k$ cannot turn back upon the sleeve K. This is effected by means of the thumb-nuts 27, which are screwed upon the ends of the shafts 24, and the cones 28 upon the other ends of the shafts 24, close to the pinions $k'$. When the thumb-nuts are tightened, the cones 28 are caused to bear hard in conical holes in the ends of the bearings, and the shafts are prevented from revolving in their bearings. By making the screw-threaded portions 6 and 4 of the same pitch, and the depth of the engagement of the lugs 8 with the projections 5 equal to this pitch, a full bearing of the lugs 8 against the projections for the amount of this depth is insured by a single turn of the shaft E. This full depth of bearing-surface always remains the same for all adjustments of the wheels upon the screw-threaded exterior of the sleeve, and the lugs 8 will always clear the projections 5 when the wheels $k$ are revolved backward to move them away from the collars $i$ or $i'$.

B' is the top plate of the bed B, and N is the table, which is pivoted upon the pin 30, secured into the said top plate. The headstock $n$ and the foot-stock $n'$ are supported upon the table N in the usual manner. Slots 31, are formed through each end of the top plate B' concentric with the center of the pin 30. The table N is provided with similar curved slots 32, which do not extend clear through it, and these slots 32 are each provided with a flange 33 at the bottom of it. Clamping-bolts 34 extend through the slots 31 and 32, and are provided with hooks 35 at their upper ends for engaging with the said flanges 33. The lower ends of the bolts 34 are provided with T-shaped heads 36, the upper surfaces of which are inclined in opposite directions to effect the clamping of the table.

P is the clamping-screw, provided with a hand-wheel $p$ and projecting through the slot $p'$ across the end of the bed. The other end of the screw P engages with a screw-threaded boss 37 on the plate 38, which is supported upon the rib 39, projecting upwardly inside the bed. The end of the screw P presses against the wedge 40, which is provided with a central slot to clear the bolt, and rests upon the T-shaped head of it. When the screw P is tightened up, the wedge is forced between the inclined T-shaped head of the bolt and the under side of the top plate B', and the clamping-bolt is drawn downward, thereby securing the table to the top plate at that end of the bed where the clamping-screw is situated. A spring 41 is secured to the boss 37 and lifts the clamping-bolt upward and releases the table when the clamping-screw is turned in the reverse direction to relieve the pressure on the end of the wedge. In order that both ends of the table may be clamped simultaneously, a clamping-plate 42 is provided at the other end of it, and is supported on the rib 43, projecting upwardly inside the bed. The plate 42 is provided with wedges 44, which slide between the inclined surfaces of the T-shaped head of the clamping-bolt at that end of the machine and the under surface of the top plate B'. A spring 44' is secured to the plate 42 for lifting the bolt when the clamping-plate 42 is moved to release it. The plates 42 and 38 are connected by a bar 45, and the said bar is provided with a central plate 47, having a longitudinally-elongated hole 46 engaging with the lower end of the pin 30, which projects through the top plate B'. The bar and the clamping-plates are pivoted upon the pin 30, and the elongation of the hole 46 permits the bar to be moved endwise, while the plate 47 allows the bar 45 and the clamping-screw to be placed nearer to the front of the machine where the clamping-wheel $p$ is more convenient to the hand of the operator. The bar 45 and the wedges 44 are drawn back when the wedge 40 is forced forward by the clamping-screw, so that both ends of the table are clamped, and may also be unclamped, simultaneously.

The clamping devices are pivoted on the pin 30, and the clamping-bolts may be moved back and forth in the slots 31 of the top plate B'. This largely increases the range of the pivotal adjustment of the table without increasing the width of the table, as when the clamping-bolts have been moved in either direction to the ends of the slots 31 the table can be turned in the same direction until the ends of the slots 32 come against the hooked upper ends of the clamping-bolts at the ends of the slots 31.

The position of the table is roughly adjusted by turning it by hand upon its pivot-pin, and a finer adjustment to any exact angle is obtained by means of the screw R. This screw is journaled crosswise of the bed at one end of the table in the bearing R'. A screw-threaded nut $r$ slides back and forth upon the screw R, and is provided with a cross-groove $r'$ in its upper side, which is flat and bears against the under side of the table and prevents the said nut from being revolved by the screw. A pin 50 is pivoted in a hole in the table, and is provided with a flat-sided projection 51, which engages with the cross-groove $r'$ of the nut. The pin is provided with a head 52 and is easily removed from its hole, so that the table can be turned by hand. When a fine adjustment is required, the pin is dropped into place and the screw R is turned. The nut on the said screw moves the table by means of the pin engaging with it, and which is free to revolve in its hole, and therefore adapts itself to the angularity of the table. The projection 51 at the same time moves crosswise in the groove $r'$ of the nut as the pin is moved around the arc of the circle in either direction from the center line of the machine, and the pin still remains in operative engagement with the nut $r$.

S is the water-fender. (Shown in detail in Figs. 9 and 10 and indicated by the dotted lines in Fig. 2.) This fender prevents the water from the grinding-wheel from splashing over the operator. It consists of a series of curved plates S' and wedge-shaped brackets $s$, which slide longitudinally upon the top of the table N. These brackets are provided with thumb-screws $s'$, which engage with square nuts sliding in the longitudinal T-shaped slot 52 in the table, so that the brackets may be moved along and clamped in any position. Each curved plate S' has an offset portion 53, which overlaps the main portion of the next adjacent similar curved plate S', so that the brackets can be moved to shorten or lengthen the whole length of the fender and adapt it to the length of the work supported between the head-stock and the foot-stock.

The grinding-wheel shaft $a$ has a passage 60 through it, and 61 is a stationary pipe, which projects into one end of this passage. The grinding wheel or disk A' is secured upon the shaft $a$, between the inner hub-plate 62 and the outer hub plate 63 by the nut 64, in the usual manner. The inner hub-plate is, however, provided with radial passages 64', which communicate with the hollow shaft $a$ by means of the holes 65. A guard 66 encircles the hub-plate 62, and is provided with a flange 67 for securing it to the grinding-wheel support. A passage 68 is formed in this guard and communicates with the radial passages 64' as the grinding-wheel revolves. A short flexible pipe 69 is secured into the front part of the guard and communicates with the passage 68. A guide 70 supports this pipe, and 71 is a thumb-screw, by which the said guide is pivoted to and clamped to the guard. The lower end of the pipe is secured to the guide by the loop of wire 72. The pipe 61 communicates with any suitable supply of liquid for cooling the grinding-wheel and the work, and the rapid motion of the grinding causes the liquid to be drawn up the said pipe and through the hollow shaft. The radial passages in the hub-plate discharge the cooling-liquid through the passage 68 and down the pipe 69 onto the work in front of the grinding-wheel. When the grinding-wheel becomes worn, the thumb-screw 71 is loosened and the guide 70 is turned on its pivot to cause the liquid to be delivered at the desired place, and the thumb-screw is then tightened up again.

What I claim is—

1. The combination, with the cross-shaft E, adapted to traverse the grinding-wheel longitudinally, and the worm-wheel mounted on the said shaft, of the longitudinal shaft F and the worm secured thereon and gearing into the said worm-wheel, reversing devices supported by the shaft F, a sleeve mounted on a screw-threaded portion of the shaft E, an oscillating plate secured upon the said sleeve and operatively connected with the said reversing devices, and collars secured to the shaft E at each end of the sleeve and provided with projections adapted to engage with lugs operatively connected with the said plate, and adapted to rock the said plate at each end of the traverse of the sleeve upon the shaft, and thereby to operate the said reversing devices and permit the shaft F to be revolved in the reverse direction, substantially as set forth.

2. The combination, with the hollow shaft F, provided with longitudinal slots, and the worm secured on the said shaft and operatively connected with the devices for traversing the grinding-head longitudinally, of the two beveled toothed wheels provided with projections and mounted on the said shaft, a revoluble beveled toothed driving-wheel gearing into the said two wheels, and a rod provided with a cross-plate projecting through the said slots and adapted to engage with either of the projections on the said two wheels, whereby the direction of the revolution of the shaft may be reversed by moving the said rod longitudinally inside the hollow shaft, substantially as set forth.

3. The combination, with the hollow shaft F and a sliding rod operatively connected to the reversing devices and provided with a screw-threaded end projecting from the said shaft, of a longitudinally-adjustable screw-threaded thimble engaging with the said end, a pivoted reversing-lever engaging with the said thimble and operatively connected with the traversing mechanism of the grinding-wheel, and a screw for clamping the thimble on the rod after its position has been adjusted, substantially as set forth.

4. The combination, with the cross-shaft E, adapted to traverse the grinding-wheel longitudinally, and the worm-wheel mounted on the said shaft, of the longitudinal shaft F and the worm secured thereon and gearing into the said worm-wheel, reversing devices supported by the shaft F, a sliding sleeve mounted on a screw-threaded portion of the shaft, an oscillating plate secured upon the said sleeve and operatively connected with the said reversing devices, collars provided with projections and secured to the shaft E at the ends of the traverse of the said sleeve, and wheels adapted to be slid lengthwise upon the ends of the said sleeve to adjust the length of the longitudinal traverse of the grinding-wheel, and provided with lugs adapted to engage with said projections of the collars at each end of the traverse of the sleeve upon the shaft, and thereby to operate the said reversing devices, substantially as set forth.

5. The combination, with the screw-threaded sliding sleeve K and the oscillating plate secured upon the said sleeve, of the toothed wheels provided with projecting lugs and screwed upon the end of the said sleeve, and the revoluble shafts journaled in the said plate and provided with toothed pinions and knobs for turning the pinions, whereby the position of the wheels upon the sleeve may be adjusted to vary the length of the longitudinal traverse of the grinding-wheel.

6. The combination, with the screw-threaded sliding sleeve K and the oscillating plate secured upon the said sleeve, of the toothed wheels provided with projecting lugs and screwed upon the ends of the said sleeve, the revoluble shafts journaled in the said plate and provided with toothed pinions gearing into the said wheels, and cones engaging with conical holes in the said plate, knobs splined on the said shafts, whereby the said pinions may be turned to adjust the position of the wheels upon the sleeve and to vary the length of the longitudinal traverse of the grinding-wheel, and thumb-nuts screwed upon the ends of the shafts which project through the said knobs for clamping the shafts after the position of the wheels upon the said sleeve has been adjusted.

7. The combination, with the cross-shaft E, adapted to traverse the grinding-wheel longitudinally, and the worm-wheel mounted on the said shaft, of the longitudinal shaft F and the worm secured thereon and gearing into the said worm-wheel, the screw-threaded sleeve K, sliding upon a screw-threaded portion of the shaft E, the collars provided with projections and secured to the shaft E, the oscillating plate secured upon the said sleeve, the adjustable toothed wheels screwed upon the ends of the said sleeve and provided with lugs adapted to engage with the projections of the said collars, reversing devices mounted on the shaft F, the pivoted reversing-lever operatively connected with the said reversing devices, a rod pivotally connecting the reversing-lever to the said plate, and a spring-actuated arm provided with a wedge-shaped projection adapted to engage with a similar projection upon the said reversing-lever and to complete the reversal of the said reversing devices when the said plate and adjustable wheels are moved by one of the said collars to actuate the reversing-lever, substantially as set forth.

8. The combination, with the top plate B', provided with a curved slot in each end, of a pivot-pin projecting from the said plate, a table pivoted upon the said pin, and also provided with a curved slot at each end, clamping-bolts adapted to be slid crosswise of the table in the slots of the top plate and table, wedges for tightening the said bolts, a bar operatively connecting the said wedges and pivoted to the said pin, and a screw at one end of the bed for tightening the clamping-wedges simultaneously at the opposite ends of the bed, substantially as set forth.

9. The combination, with the top plate B', provided with a curved slot at each end, of a pivot-pin projecting from the said plate between the said slots, a table pivoted upon the said pin and also provided with a curved slot at each end, and clamping-bolts adapted to be slid crosswise of the table in the said slots of the top plate and table, whereby the table may have an extensive angular adjustment.

10. The combination, with the top plate provided with slots, of a pivot-pin projecting from the said top plate, the table pivoted upon the said pin and also provided with slots, the clamping-bolts passing through the said slots of the top plate and table and provided with reversely-inclined heads, a wedge for clamping the bolt at one end of the table, the plate provided with a screw-threaded boss, the clamping-screw working in the said boss and bearing against the said wedge, a plate provided with wedges for clamping the bolt at the other end of the table, and a bar connecting the two said plates, whereby both ends of the table may be clamped simultaneously, substantially as set forth.

11. The combination, with the top plate provided with a slot, and the table, also provided with a slot and pivoted to the said top plate, of a clamping-bolt provided with a head having an inclined surface under the said top plate, a retractible wedge interposed between the said inclined head and the under side of the table, and a spring for raising the said bolt and unclamping the table when the wedge is drawn back.

12. The combination, with the slotted top plate, of the pivot-pin projecting from the top plate, the slotted table pivoted on the said pin, the clamping-bolts passing through the slots of the said top plate and table, a wedge for tightening the clamping-bolt at one end of the table, a plate provided with a screw-threaded boss, a clamping-screw working in the screw-threaded boss and bearing against the end of the said wedge, a plate provided with wedges for tightening the clamping-bolt at the other end of the table, a bar connecting the two said plates, whereby both ends of the table may be clamped simultaneously, and a plate secured to the said bar and provided with an elongated hole engaging with the said pivot-pin, whereby the said bolts may be moved crosswise of the table in the slots, substantially as and for the purpose set forth.

13. The combination, with the top plate and the table pivoted to the top plate, of an adjusting-screw journaled crosswise of the top plate beneath the table, a nut sliding on the said screw and provided with a groove across its upper side, and a removable pin pivoted in a hole in the table and provided with a projection engaging with the said cross-groove in the nut, substantially as and for the purpose set forth.

14. The combination, with the table, of an extensible water-fender consisting of a series of curved plates, each provided with an offset portion overlapping the next adjacent curved plate, a separate bracket secured to each curved plate and sliding on the table, and bolts for clamping the said brackets to the table.

15. The combination, with the hollow grinding-wheel shaft, of a revoluble hub-plate provided with radial passages communicating with the hollow shaft, and a stationary guard encircling the hub-plate and provided with a passage communicating with the said radial passages, and an outlet-pipe for delivering liquid upon the periphery of the grinding-wheel.

16. The combination, with the stationary guard encircling the grinding-wheel and provided with a passage for liquid, of a flexible outlet-pipe projecting from the said guard and communicating with the said passage, a guide secured to the end of the said pipe, and a thumb-screw for pivoting and clamping the upper end of the guide to the guard, whereby the pipe may be adjusted to deliver liquid at different places, substantially as set forth.

In testimony whereof I affix my signature in presence of two witnesses.

ABRAHAM B. LANDIS.

Witnesses:
WILLIAM T. LEE,
ALF. N. RUSSELL.